April 16, 1963
M. B. SAMPSON
3,085,813
QUICK CHANGE CHUCK
Filed April 27, 1960
4 Sheets-Sheet 1
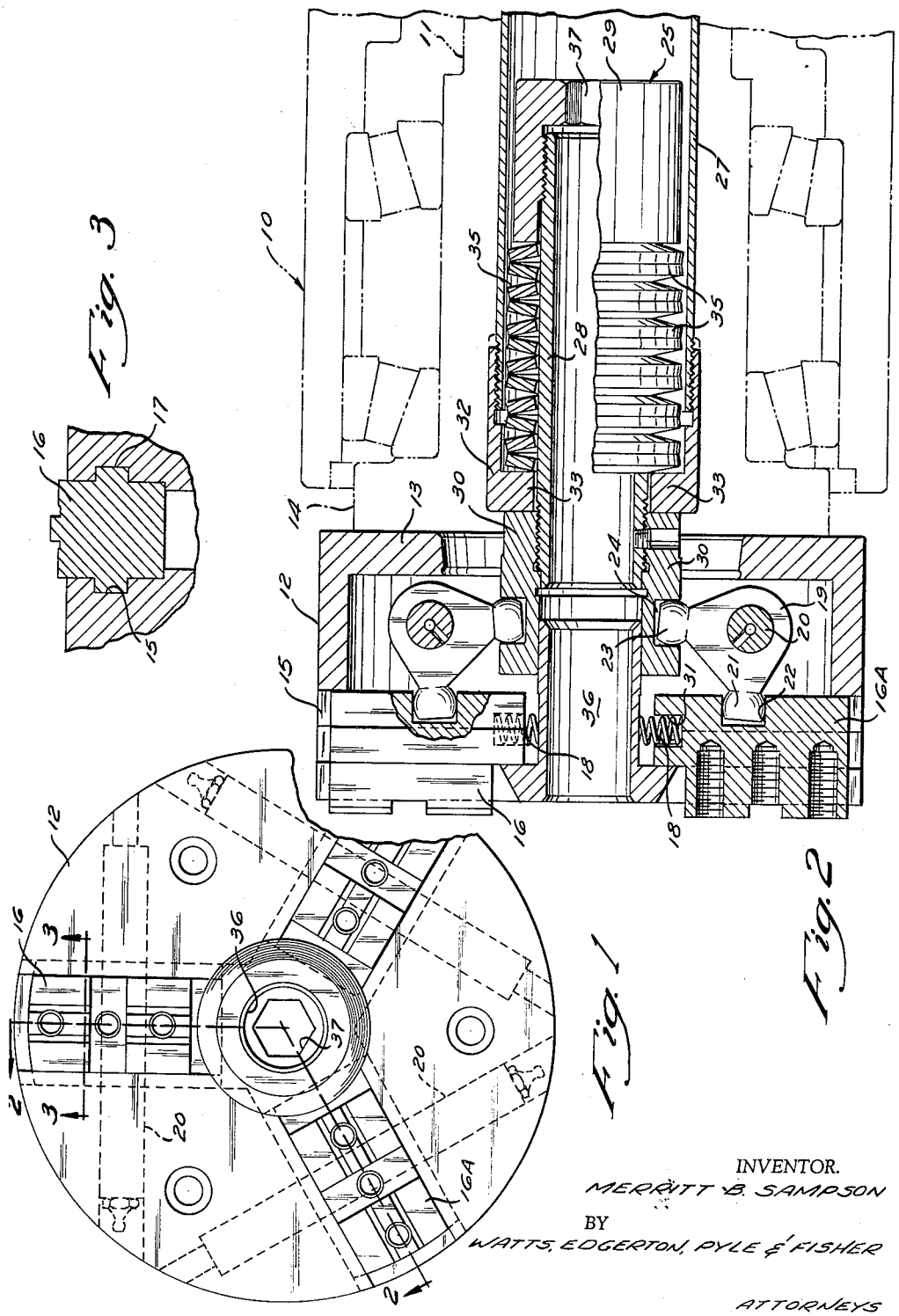
INVENTOR.
MERRITT B. SAMPSON
BY
WATTS, EDGERTON, PYLE & FISHER
ATTORNEYS April 16, 1963

M. B. SAMPSON 3,085,813

QUICK CHANGE CHUCK

Filed April 27, 1960

INVENTOR.
MERRITT B. SAMPSON
BY
WATTS, EDGERTON, PYLE & FISHER

ATTORNEYS

INVENTOR.
MERRITT B. SAMPSON
BY
WATTS, EDGERTON, PYLE & FISHER
ATTORNEYS

April 16, 1963 M. B. SAMPSON 3,085,813
QUICK CHANGE CHUCK
Filed April 27, 1960 4 Sheets-Sheet 4

INVENTOR.
MERRITT B. SAMPSON
BY
WATTS, EDGERTON, PYLE & FISHER
ATTORNEYS

United States Patent Office 3,085,813
Patented Apr. 16, 1963

3,085,813
QUICK CHANGE CHUCK
Merritt B. Sampson, Shaker Heights, Ohio, assignor to
The S-P Manufacturing Corporation, Solon, Ohio, a
corporation of Ohio
Filed Apr. 27, 1960, Ser. No. 24,987
13 Claims. (Cl. 279—119)

This invention pertains to machine tool chucks, and more particularly to a mechanism for moving slidable jaws of the chuck.

In the average machine shop there are two basic types of lathes needed: A collet machine for bar turning; and a chucking machine for castings and similar pieces which must be gripped by a chuck jaw. Unless the shop is quite specialized, it often occurs that there is more work for one machine or the other than that machine can handle, and the other machine may possibly be standing idle at the same time. Hence, it is desirable to have convertible machines. Bar machines are convertible by removing the bar actuating mechanism, the collets, and like associated parts, whereafter a chuck may be installed and a pneumatic or similar chuck actuating device mounted at the back of the machine. It is said that such a conversion of a bar machine to a chucking machine can be done in less than an hour, but actually the average workman will need far more than an hour to make such a conversion.

By the device of this invention, a standard bar machine is converted by the simple expedient of removing the collet from the machine draw tube and a chuck device made according to the principles of this invention is installed on the spindle, with the chuck draw bar connected to the draw tube of the bar machine by a novel interconnection. Thus, changeover from bar to chucking machine is made entirely at the front of the machine without disturbing the interior driving mechanism or other apparatus and controls necessary for bar work, other than to remove the collet and install the new chuck.

A machinist's chuck is a device having individually operated jaws which the machinist tightens manually to grip a workpiece of any size or configuration. At the other extreme of size tolerance is the standard bar machine employing a collet and a drive mechanism to pull up that collet upon the work. Collet machines work with close tolerance rolled stock and hence are not required to compensate for wide variances in raw workpiece size.

Between these two extremes is the area of service provided by the usual power operated chuck. Although these devices do not allow individual manual manipulation of each jaw, they nevertheless do provide a greater degree of tolerance for workpiece variation than is provided by a bar machine. Such chucks are generally used for workpieces of the class including castings, which have a greater variance in dimension than rolled stock, but nevertheless are within reasonable limits. Such power operated chucks, to accommodate workpiece size variance, must have a power delivery to the jaws which will allow the jaws to pick up a workpiece throughout a tolerance range, and then produce a power grip upon the workpiece. The power grip must be non-reversible by force acting upon the jaws.

It is not possible to mount such a chuck device upon a bar machine and employ the conventional draw bar mechanism coupled directly to the chuck actuating mechanism. The draw bar mechanism, usually a tube through which the work bar extends, has a rapid traverse of relatively long stroke to bring the collet member to a contact position with the workpiece, followed by a relatively short and high-powered stroke. To couple a chuck device to such a draw bar mechanism, it would be necessary to bore out the work-contacting jaws such that they would come into contact with the workpiece just at the changeover from rapid traverse to power stroke. Because the power stroke is so short and the location of the changeover from traverse to power is so limited it may be appreciated at once that substitution of a chuck into such an environment would provide little more than a collet. It is perfectly feasible to put individual pieces, one at a time, into a collet of a bar machine if the working dimension of the workpieces are very accurate. Normally, however, workpieces which are chucked into a chuck are not of the close tolerance variety.

The problems of using any chuck on a bar machine draw tube have been considered beyond solution. A chuck employing a straight cam jaw actuating structure must have a long travel power source able to deliver full draw power throughout the passable workpiece contact range. Bar machines provide a very short total travel, even though the rapid traverse portion of the travel is long in comparison to the power stroke portion. As an example, a three-eighths inch total travel is common in bar machine draw bars.

Chucks having internal cams producing fast jaw traverse followed by power gripping force also require a long travel power source in order to have a movement to convert to power.

Finally, if the chuck does not convert transmitted movement, then the rapid traverse and power stroke portion must come from without the chuck. It would appear that a draw tube, which does produce such proportioned movement would be suitable. It is not, however, because it must travel its full cycle and reach a "lock up" position to operate. Hence, any chuck coupled directly to such a draw tube has almost no tolerance range for workpiece size variations.

To couple such chuck to the draw tube by means of a resilient bar or spring will not operate satisfactorily, because a conventional resilient member so coupled directly to the chuck, if strong enough to provide the necessary transmission of several thousand pounds of force, would stall the draw tube drive if oversize pieces were encountered. On the other hand, such resilient devices transmit a variable power when placed in tension, and hence must be extended a given amount to produce a specified power delivery. Undersize pieces may not produce enough extension of such device to produce full holding power.

Furthermore, hollow or other fragile workpieces, may require an adjustment of transmitted force, which cannot be obtained by any conventional resilient coupling device.

Hence, it is the accomplished object of this invention to provide a chuck for use in converting a bar machine in a matter of minutes to a chucking machine, by merely attaching the chuck device to the front end of a draw tube of such bar machine, and to provide all the usefulness of a fluid cylinder powered chuck, including workpiece holding pressure variation and size tolerances, but without need for any fluid lines.

The interconnection of the chuck of this invention to the draw tube is accomplished by a pre-load resilient device with transmits a one-to-one power movement until stressed to its yield point, whereafter it transmits a substantially constant force and the predetermined value throughout a range.

It has been suggested that a resilient draw bar be connected from such a chuck device to the power draw tube of a bar machine and hence allow the jaws to come upon a workpiece regardless of its size, whereafter the resilient draw bar might yield and allow the full travel of the machine draw bar.

However, the drive mechanism for bar machines which provides the rapid traverse, followed by the short power stroke, is such that a resistance to movement during the rapid traverse portion of the stroke, in magnitude sufficient to clamp a workpiece in a chuck, would stall the driving mechanism before it could reach the power stroke portion.

It is small wonder, when the circumstances surrounding the total problem are understood, that in spite of the many suggested uses of resilient draw bars, no commercial chucking adapter has heretofore been provided for actuation by the draw tube of a collet bar machine. This invention provides such a chuck adapter in an exceedingly convenient and useful form.

Several additional advantages are provided by this mechanism. The machine draw tube is converted by a flanged end collar which threads onto the threaded end of the machine draw tube. With this arrangement, the entire chuck assembly is removable as a unit from the machine draw tube for repair, substitution of chucks of other sizes, or substitution of other workpiece holders such as collets. This same constructional feature permits the mechanism to be readily designed and constructed to be mounted on existing machine tools without, in any way, modifying the lathe or other machine tool.

Another advantage of this invention is that the prestressed transmission spring tension is adjustable after the chuck is mounted on the machine tool spindle. This is accomplished by providing a chuck and chuck draw bar in tubular form so that a central through axial passage is provided. The chuck draw bar shoulder is provided in the form of an end cap which is threaded onto the end of the chuck draw bar. The end cap has a wrench receiving socket. With this construction the spring tension is adjustable by inserting a long wrench through the axial passage and engaging it with the wrench receiving socket in the chuck draw bar end cap. The chuck draw bar end cap is then rotated to thread the cap to a selected position and thus compress or relax the spring for tension adjustment.

Other objects and a fuller understanding of the invention may be had by referring to the following description and claims taken in conjunction with the accompanying drawings in which:

FIGURE 1 is a front elevational view of the outer face of the chuck;

Figure 2A:
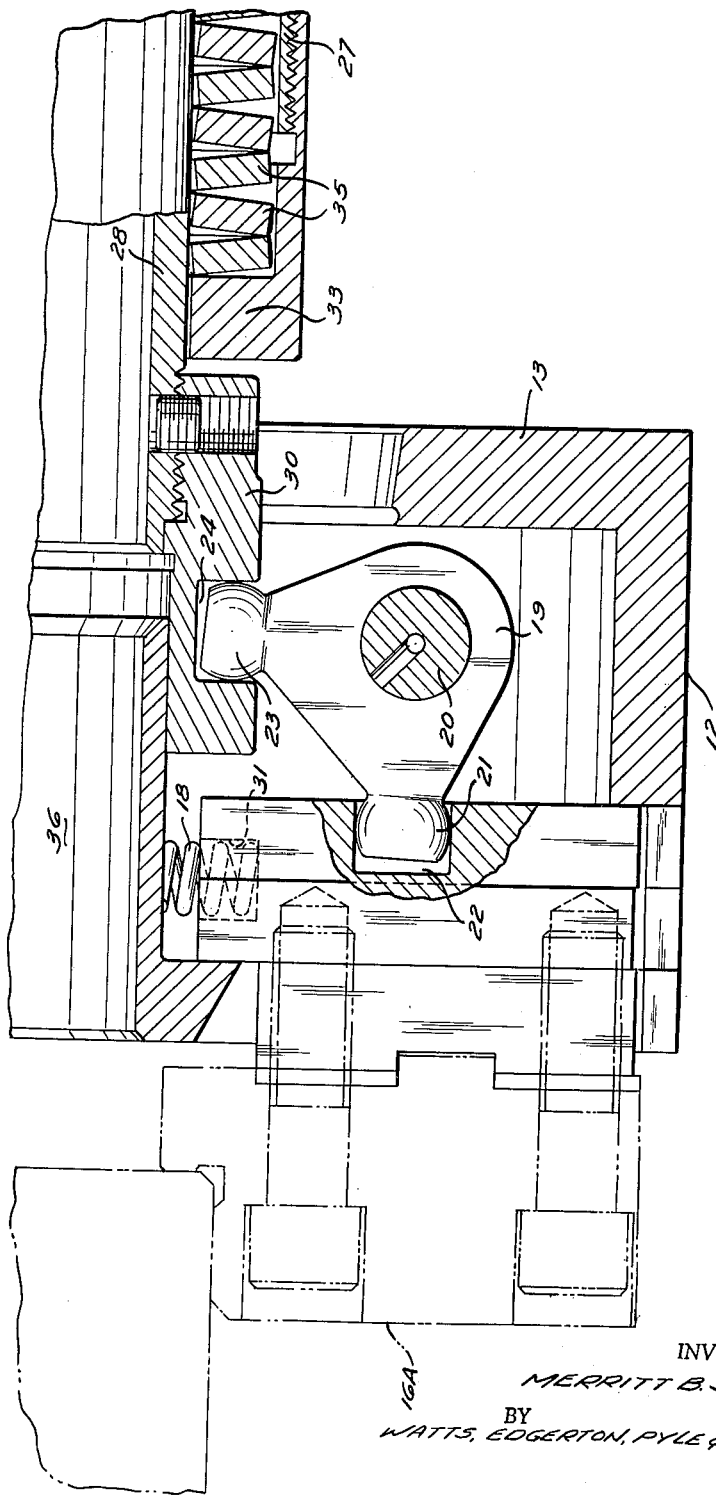
FIGURE 2 is a sectional view of the chuck with the jaws in their open position as seen from the plane indicated by the line 2—2 of FIGURE 1.
Figure 4:
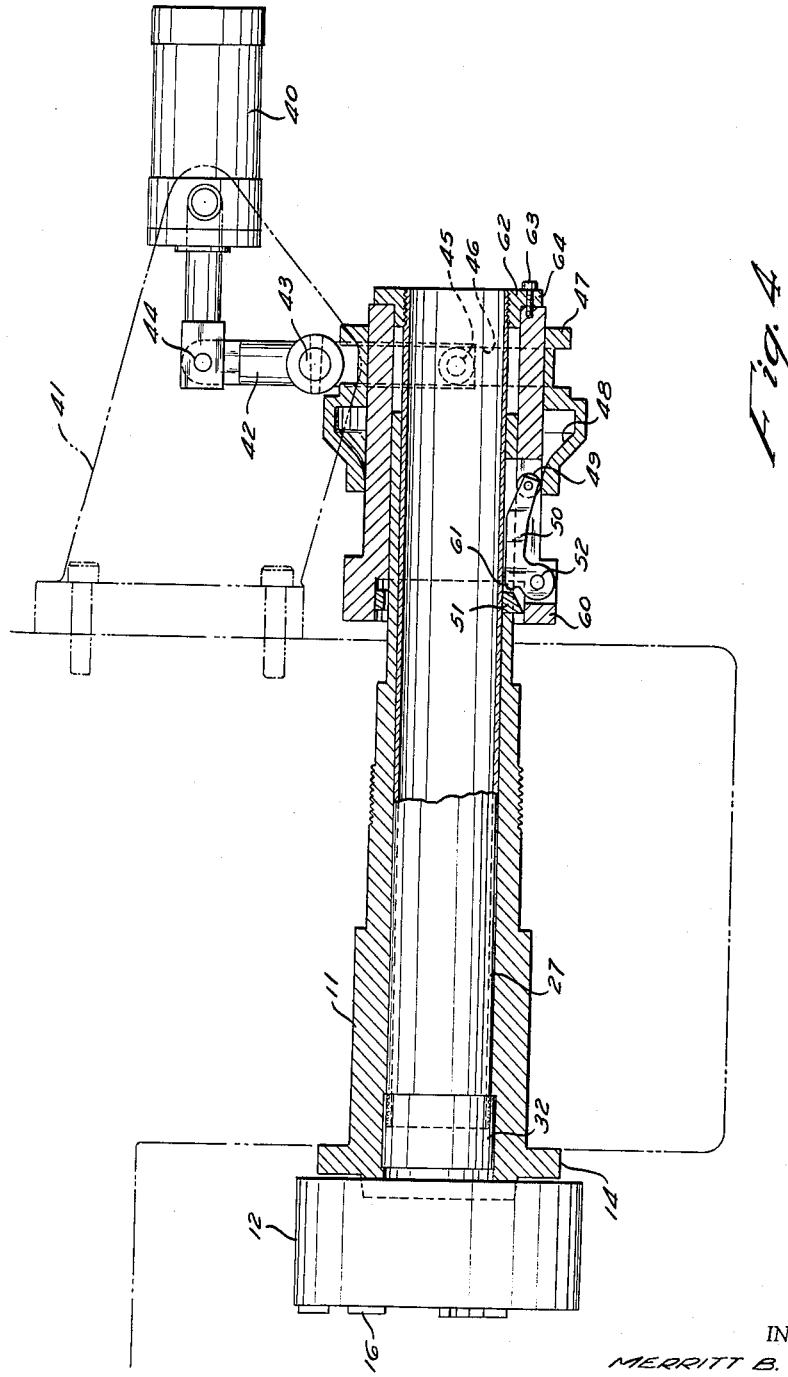
Figure 5:
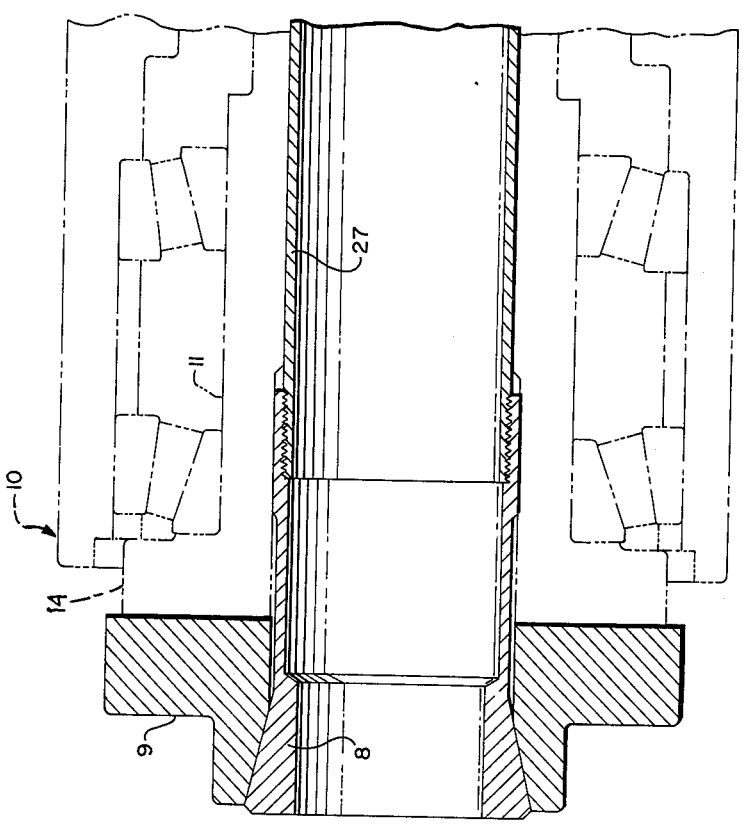

FIGURE 2-A is a partial longitudinal section, taken along the ilne 2—2, with removable jaws secured to the master jaws and a workpiece held therein, the transmission spring interconnection being illustrated compressed to full clamping condition;

FIGURE 3 is a fragmentary sectional view of one of the jaws and guide tracks as seen from the plane indicated by the line 3—3 of FIGURE 1;

FIGURE 4 is a side elevational view with parts broken away and removed and with the draw tube and the parts of the draw tube actuating mechanism shown in section, and FIGURE 5 is a side elevational view, partially in cross-section, illustrating the prior art arrangement of a conventional collet-type chuck attached to the head stock and draw tube of a standard bar machine.

Referring to FIGURES 2 and 5 of the drawings, the head stock of a machine tool is shown in phantom at 10. A tubular spindle 11 having an end flange 14 is journaled in the head stock for rotation relative to the head stock. The standard draw tube of the machine tool, indicated by reference character 27, is carried axially of the spindle 11. The machine draw tube 27 rotates with the spindle 11 and is reciprocal relative to the spindle 11 in a manner which will subsequently be described in more detail.

As illustrated in FIG. 5, the conventional arrangement employing a collet-type chuck has been to connect the collet 8 to the machine draw tube 27 and the cooperating hood 9 to the end flange 13 of the spindle 11. As has been generally discussed above, it is a purpose of the present invention to provide for a replacement of a collet chuck by a novel power chuck assembly, whereby the machine tool is readily converted to a chucking machine. In prior practice, removal of the machine draw tube 27 was required before converting by a chuck adaptor and driving device.

This invention is useful for most power operated chucks, and for purposes of illustration a popular three-jaw lever operated jaw chuck is employed. This chuck is built into a body 12 having an inwardly directed annular mounting flange 13 at its inner end. The mounting flange 13 is secured to the end flange 14 on the spindle 11. Flange 13 is also made as a separate adapter plate in some model chucks.

The chuck body 12 has an outer face in which a plurality of spaced ways 15 are formed. A slidable master jaw 16 is disposed in each of the ways 15 for reciprocating movement along a radial path. A key way guide system indicated by reference character 17 is provided on each of the jaws and in the side walls of the ways 15. Replaceable work jaws 16A are bolted to master jaws 16 as actual workpiece engaging members.

A plurality of operating levers 19, each carried by a pivot 20, are used to transmit drive force to the jaws 16. Each of the levers 19 has a jaw engaging knob 21 disposed in a recess 22 provided in the inner face of the jaw with which it is associated. Each of the levers 19 also has a draw bar engaging knob 23. Each of the draw bar engaging knobs is disposed in an annular groove 24 formed in the outer surface of a collar 30 portion of a chuck draw bar 25.

According to the present invention the chuck is equipped with a draw bar which telescopes with the machine draw tube 27, and a novel drive transfer is provided to transmit power from the machine draw tube 27 to the draw bar 25.

The chuck draw bar 25 has a tubular shank 28 with an inner end cap 29 and a collar 30 threaded respectively onto the inner and outer ends of the shank 28.

The machine draw tube 27 is threaded at the end and, for the illustrated embodiment of this invention, is fitted with an annular end cap 32. The annular end cap 32 has an inwardly directed annular flange 33 which surrounds the shank 28 of the chuck draw bar. Thus, the shank 28 and the inner end cap 29 of the chuck draw bar 25 are disposed within the machine draw tube 27 when the chuck assembly is mounted on the machine.

The inner end cap 29 of the chuck draw bar and the end cap flange 33 serve as spaced opposed shoulders. A spring is interposed between the shoulders. In the preferred and disclosed embodiment the spring takes the form of a plurality of Belleville springs 35. The tension of the spring 35 can be adjusted by rotating the inner end cap 29 of the chuck draw bar. Rotation of the inner end cap 29 is accomplished by passing an Allen wrench through a passage 36 provided along the axis of the chuck. The wrench is inserted in a hexagonal hole 37 provided in the end wall of the end cap 29, and the cap is threaded to a desired longitudinal position, thereby compressing or releasing springs 35 as desired.

The machine draw tube 27 has a rapid traverse followed by a slow high power movement provided by the lever system illustrated in FIGURE 4 and described more fully hereinafter. A graph showing travel versus power would result in a line extending somewhat flat and then turning upwardly at a steep angle towards the end of the travel. The springs 35 are prestressed to the value of the approximate amount of power desired to be applied to the levers 19. Thus, as the machine draw tube 27 is retracted during the early part of its travel, the chuck draw bar 25 will travel along and produce a rapid movement of the master jaws 16 toward the workpiece. None of the drawings illustrates the completely opened position of the jaws, but normally the jaws are moved outwardly to approximately the outer diameter of the chuck body in their fully opened position. FIGURE 2 illustrates the inward movement o fthe jaws through the rapid traverse just described, with the jaws just coming to the position wherein work jaws attached thereto should come into abutment with the workpiece. After the work jaw members 16A contact the work, they can close no more and hence the springs 35 will begin to compress between the opposed abutment shoulders after a pressure greater than the prestressed pressure condition has been reached. Continuation of movement of the machine draw tube 27 thereafter produces a separation of the flange 33 and the cam fitting 30. This condition is shown in FIGURE 2-A. There is now a pressure exerted upon the levers 19 in a magnitude determined by the compression of the springs 35.

In most bar machine lathes having collet actuating devices as illustrated in FIGURE 4, no forward drive is provided. Merely releasing the machine draw tube 27 will permit the normal collet to expand by spring force to release the bar and allow the bar to be indexed forward. In order to cause the master jaws 16 of this chuck device to open, at the end of a work cycle, a radial spring 18 is carried in a bore 31 of each master jaw 16. These springs have a relatively low compressive strength in comparison to the closing force transmitted to levers 19, and hence deduct an insignificant amount of force applicable to the workpiece. In one example these springs have a 100 pound compression strength as compared to a prestressed condition of about 6,000 pounds on the Belleville springs 35. Hence, when the machine draw tube 27 is released, the springs 18 will move the master jaws 16 outwardly to their open position and will pull the levers 19 and the associated actuating apparatus therealong.

Referring now to the FIGURE 4, the lineal clamping movement of the machine draw tube 27 is obtained by actuating a prime mover in the form of fluid motor 40. The fluid motor 40 is carried by a bracket 41 which is connected to the head stock 10. A yoke 42 is pivotally mounted at 43 and connected to the piston of the fluid motor 40 at 44. When the fluid motor is actuated, the connection 44 is shifted to the right causing the yoke 42 to pivot about the axis of the pivot 43. Rollers 45, only one of which is shown, on the ends of the yoke, are disposed in an annular groove 46 of a collar 47. The described pivoting of the yoke 42 will shift the rollers 45 to the left as seen in FIGURE 4, driving the collar 47 with it.

A drive spider 60 is journaled around the end of the spindle 11 and carries clamp levers 50 on pivotal mounts 52. A clamp ring 51 provides a convenient abutment surface carried by the spindle 11 against which the lever 50 may abut. The lever 50 is shaped to present a contact pivot shoulder 61 to abut the clamp ring 51. Because of the location of pivot 52 with respect to the contact pivot 61 and the length of the lever 50, the lever 50 will produce a high mechanical advantage when the end of the lever 50 fitted with roller 49 is pivoted about pivot 52 in a counterclockwise direction. As shown in FIGURE 4, the lever 50 is in its greatest possible counterclockwise position and reaction leverage transferred from the longitudinal stationary spindle 11 to the spider 50 through the pivot 52, is at its maximum force condition.

The collar 47 has an inner cam surface 48 on which the roller 49 of lever 50 rides when the collar 47 is advanced to the left in FIGURE 4 toward the chuck. Roller 49 is free to ride down the cam surface 48 and release the contact between the contact pivot 61 and the ring 51.

The spider 60 is attached to the draw bar 27 through a threaded attachment collar 62. The only significant force applied from spider 60 to the collar 62 will be in the direction to the right in FIGURE 4 and hence the attachment between these members is a mere physical interlock by means of screw 63. A shoulder 64 provides an abutment against which the spider 60 can press for delivery of force through the collar 62 to the draw bar 27. On release of spider 60 only the force of springs 36 tends to return the bar 27 and the associated mechanism and forces on such return will not be significantly great.

Therefore, the draw bar 27 is released by shifting of the collar 47 to the left in FIGURE 4 and thereby allowing the lever 50 to pivot clockwise around the pivot 52. Retraction of the collar 47 to the right in FIGURE 4, will drive the lever 50 in a counterclockwise direction and bring the contact pivot 61 against the abutment shoulder in the form of ring 51 and produce the exceedingly high mechanical advantage needed to force the bar 27 to the right in FIGURE 4 and power the closing of the mechanism operating the chuck jaws.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a machine tool having a rotatable spindle and a rotatable and axially reciprocal draw member extending within said spindle, the combination of a chuck having a body secured to said spindle, workpiece holder jaw means carried by said body, said jaw means being movable to engage and exert clamping pressure on a workpiece, an axially reciprocal chuck draw bar having an end portion extending axially of said body into overlapping relationship with an end portion of said draw member, means connecting said chuck draw bar to said jaw means for causing workpiece engaging movement of said jaw means when said chuck draw bar is axially moved, and yieldable compression linkage means disposed between and operatively connecting the overlapped portions of said draw member and said draw bar for effecting clamping pressure of said jaw means subsequent to said workpiece engaging movement.

2. In the combination defined in claim 1, said combination of chuck and draw bar being a separable unit, a shoulder member on said end portion of said draw bar, said yieldable means encompassing said draw bar and abutting said shoulder member, and an attachment collar removably secured on said end portion of the draw member and spaced axially from said shoulder member, said attachment collar having a second abutment shoulder extending laterally with respect to said draw member, and said yieldable means lying between said shoulder member and said collar shoulder, whereby movement of said draw member in a retraction direction from said chuck will transmit force to the draw bar through said yieldable means.

3. In the combination of claim 1, said combination of chuck and draw bar being a separable unit, first and second opposed second shoulder members externally of said draw bar, said first shoulder member being on said end portion of said draw bar, and an attachment collar removably secured on said end portion of said draw member, said attachment collar having a laterally directed flange located between said first and second opposed shoulders, and said yieldable means lying between said first shoulder member and said flange, whereby movement of said draw member in a retraction direction from said chuck will transmit force to the draw bar through said yieldable means.

4. In a machine tool including a tubular spindle journaled in a headstock, the combination of a tubular machine draw member in the spindle for rotative and reciprocal movement relative to the headstock, the machine draw member including an end opening and flange partially closing said end opening, a chuck draw bar including a shank extending through said opening into the tubular machine draw member and having a shoulder adjacent the inner end of the shank, a plurality of Belleville springs carried by the shank and interposed between the flange and the shoulder, a chuck body connected to the other end of the chuck draw bar, the chuck body and chuck draw bar relatively movable axially, the body including a plurality of radially disposed jaw ways in the outer face thereof, a jaw carried in each of said ways, a plurality of jaw actuation levers pivotally mounted in the body, there being a like member of levers and jaws, and each of the levers being connected to said chuck draw bar and to one of said jaws.

5. In a machine tool including a tubular spindle journaled in a headstock, the combination of a draw member in the spindle mounted for rotative and reciprocal movement relative to the headstock, the draw member including an end opening and a flange partially closing said opening, a chuck draw bar including a shank disposed in the draw member and having a shoulder adjacent the inner end of the shank, a plurality of Belleville springs carried by the shank and interposed between the flange and the shoulder, a chuck body connected to the other end of the chuck draw bar, the chuck body and chuck draw bar relatively movable axially, the body including a plurality of radially disposed jaw ways in the outer face thereof, a jaw carried in each of said ways, a plurality of jaw actuation levers pivotally mounted in the body, there being a like number of levers and jaws, a fluid motor including first and second relatively movable elements, the first element being secured to the headstock, and a linkage connecting the fluid motor second element to the machine draw member to cause lineal movement of the machine draw member when the motor elements are moved relatively.

6. In a machine tool having a headstock, a spindle journaled in the headstock, an axially shiftable draw member disposed at least in part within the spindle, and means to selectively shift the draw member axially, the combination of, a chuck draw bar including a shank portion and a shouldered end disposed within said draw member, a tubular end cap including an inwardly directed flange carried on the draw member end surrounding the shank portion, resilient means interposed between the flange and the shoulder and urging the draw bar inwardly relative to said draw member, said draw bar including a shoulder coactable with said cap to limit the inward movement of the draw bar, a chuck body connected to the draw bar in axially shiftable relationship, a plurality of circumferentially spaced jaws carried by said body, at least one of said jaws being radially movable, and lever means carried by the body and connected to the draw bar and each such movable jaw to shift each such movable jaw radially when the draw bar is shifted axially relative to the body.

7. The device of claim 6 wherein the resilient means comprises a plurality of Belleville springs.

8. In a machine tool member having a rotatable spindle and a rotatable and axially reciprocal draw member extending within said spindle, the combination of a chuck having a body secured to said spindle, jaw means carried by said body, said jaw means being movable to engage and then exert clamping pressure on a workpiece, an axially reciprocal chuck draw bar, said draw bar having an end portion disposed in telescopic relationship with said draw member and being axially movable relative thereto, jaw operating means connected to said draw bar and to said jaw means for moving said jaw means to engage a workpiece when said draw bar is shifted axially, and yieldable compression means disposed between and operatively connecting the telescoped portions of said draw bar and said draw member, said compression means permitting said draw bar and draw member to be moved first as a unit whereby a workpiece is engaged by said jaw means and then said draw member to be moved axially relative to said draw bar whereby said compression means is compressed to effect clamping pressure by said jaw means.

9. In a machine tool having a head stock, a spindle rotatably journalled in such head stock, and a rotatable and axially reciprocal draw member extending within said spindle, the combination comprising a chuck body secured to an end of said spindle, radially movable jaw means carried by said body for engaging and then clamping a workpiece, an axially chuck draw bar extending axially from said body into said spindle, said draw bar having an end portion disposed in telescopic relationship with said draw member within said spindle, jaw operating means carried by the opposite end portion of said draw bar within said body for causing said jaw means to be moved into engagement with a workpiece when said draw bar is shifted axially relative to said body, and yieldable spring means disposed between and operatively connecting the telescoped portions of said draw bar and draw member for permitting said draw bar and draw member to be moved first as a unit whereby said jaw means are engaged with a workpiece and then said draw member moved relative to said draw bar to compress said spring means whereby clamping pressure is effected by said jaw means.

10. A chuck assembly which is designed for attachment as a unit to a rotatable spindle of a machine tool and for operation by a reciprocal draw member of the machine tool extending within said spindle, said chuck assembly comprising a body adapted to be connected to the spindle, radially movable jaw means carried by said body, said jaw means being movable to engage a workpiece and exert clamping pressure, an axially shiftable draw bar having a portion extending from said body, means connecting said draw bar to said jaw means within said body for causing said jaw means to move when said draw bar is axially shifted, said extending portion of said draw bar being formed to telescopically mate with a portion of the draw member within the spindle, and spring means carried by said draw bar in position to be engaged by the draw member when telescopically mated with said draw bar.

11. In a machine tool having a tubular spindle, the combination of a chuck mounted on the spindle, said chuck including at least one slidably carried movable jaw said chuck including movably mounted jaw actuation means connected to each said movable jaw, longitudinally movable control means carried by the machine tool and connected to said actuation means, said control means to actuation means connection including a preloaded resilient means interposed between said control means and said actuation means so that longitudinal movement of said control means will transmit force through said resilient means to said jaw actuation means, and said connection also including means to adjust the tension of said resilient means.

12. The device of claim 11 wherein said control means is tubular and is disposed in said spindle, and wherein a prime mover is connected to said control means to cause selective reciprocation and thereby actuate said actuation means.

13. The device of claim 12 wherein said preloaded resilient means is compressibly interposed between said control means and said actuation means.

References Cited in the file of this patent

UNITED STATES PATENTS

| | | |
|---|---|---|
| 1,813,705 | Lewis | July 7, 1931 |
| 1,871,463 | Olson | Aug. 16, 1932 |
| 2,252,840 | Drissner | Aug. 19, 1941 |
| 2,681,230 | Williams | June 15, 1954 |
| 2,778,649 | Klem | Jan. 22, 1957 |
| 2,821,405 | Becker | Jan. 28, 1958 |